United States Patent [19]

Yarkoni et al.

[11] Patent Number: 5,175,833

[45] Date of Patent: Dec. 29, 1992

[54] APPARATUS FOR DETERMINING RELATIVE POSITION OF A CACHE MEMORY IN A CACHE MEMORY ARRAY

[75] Inventors: Eran Yarkoni; Zvi Netzer, both of Haifa, Israel

[73] Assignee: Intel Corporation, Santa Clara, Calif.

[21] Appl. No.: 534,753

[22] Filed: Jun. 7, 1990

[51] Int. Cl.⁵ .............. G06F 13/00; G06F 13/16; G06F 12/00; G06F 12/04
[52] U.S. Cl. .............. 395/425; 364/DIG. 1; 364/DIG. 2; 340/825.5; 340/825.52
[58] Field of Search ... 364/200 MS File, 900 MS File; 340/825.5, 825.52; 395/425; 365/233

[56] References Cited

U.S. PATENT DOCUMENTS

| | | | |
|---|---|---|---|
| 4,360,870 | 11/1982 | McVey | 364/200 |
| 4,468,729 | 8/1984 | Schwartz | 364/200 |
| 4,951,248 | 8/1990 | Lynch | 364/900 |
| 4,964,038 | 10/1990 | Louis et al. | 364/200 |

Primary Examiner—Joseph L. Dixon
Assistant Examiner—Gregory D. Leibold
Attorney, Agent, or Firm—Blakely, Sokoloff, Taylor & Zafman

[57] ABSTRACT

A cache memory which includes a cache controller formed on a single substrate. A plurality of the identical memories may be used in an array. The memories themselves determined how many other memories are in an array and each of their relative positions in the array. From this information, each memory sets the range of its set fields and the size of its tag fields. This is done on reset with the configuration information being distributed among the memories themselves, without being centrally stored, and in a manner transparent to the software.

9 Claims, 5 Drawing Sheets

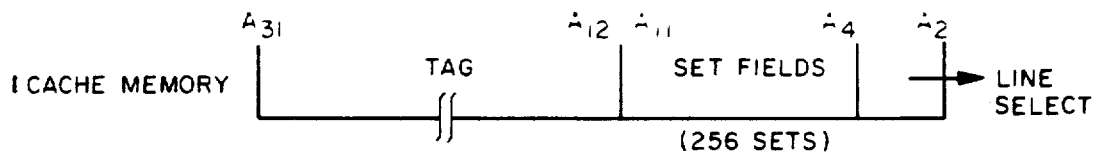
FIG_1A
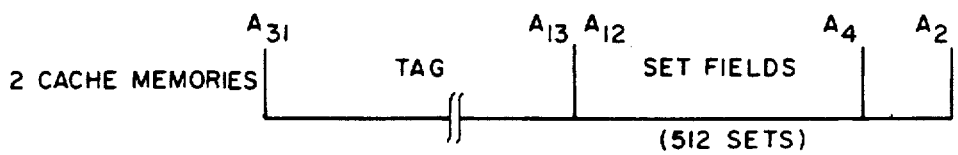
FIG_1B
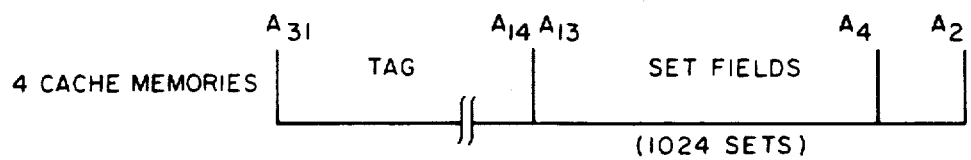
FIG_1C
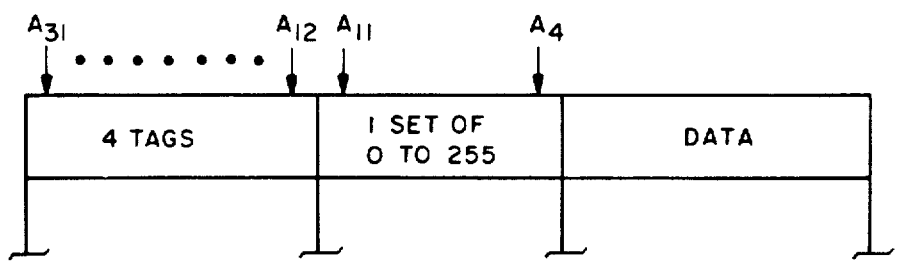
FIG_1D
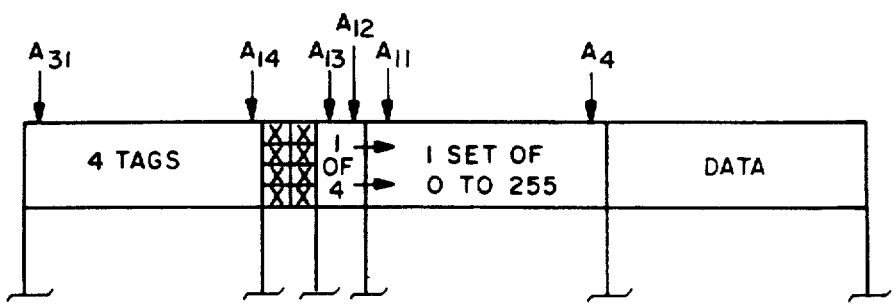
FIG_1E

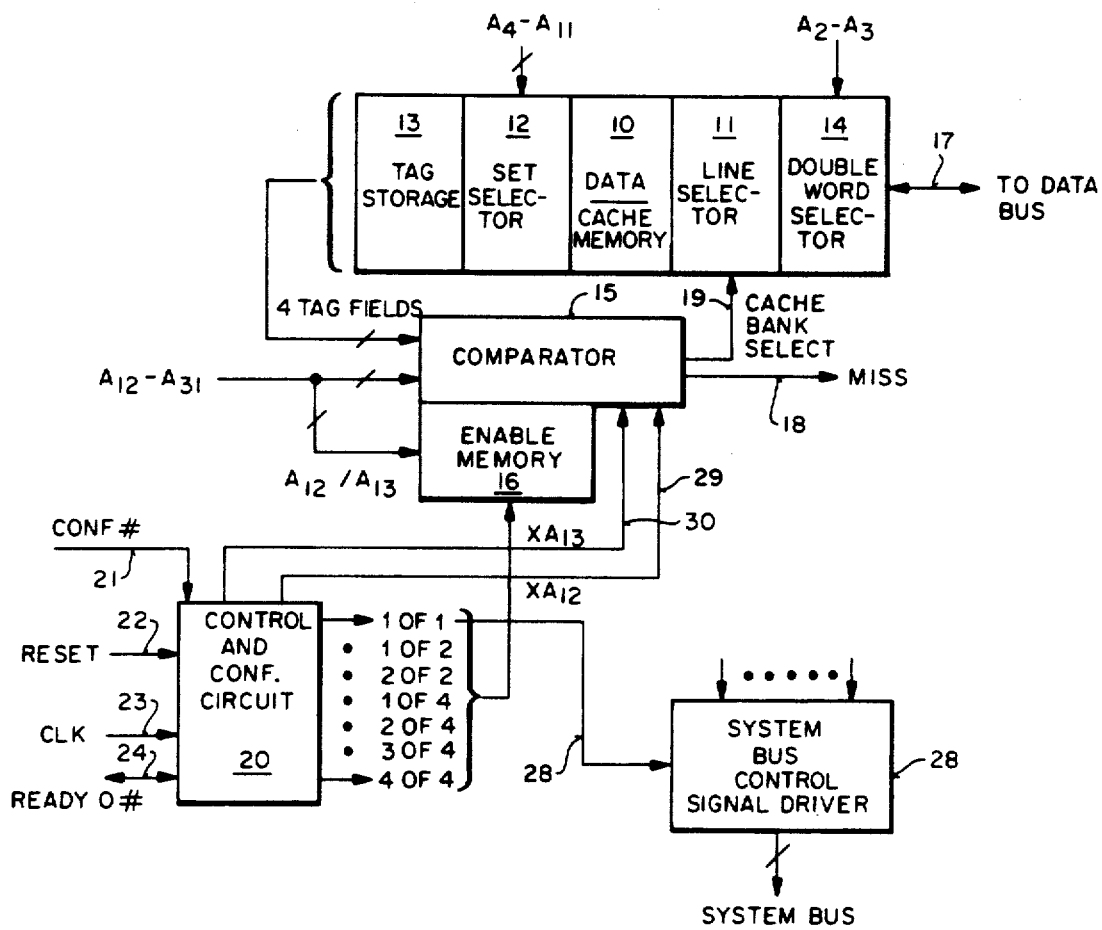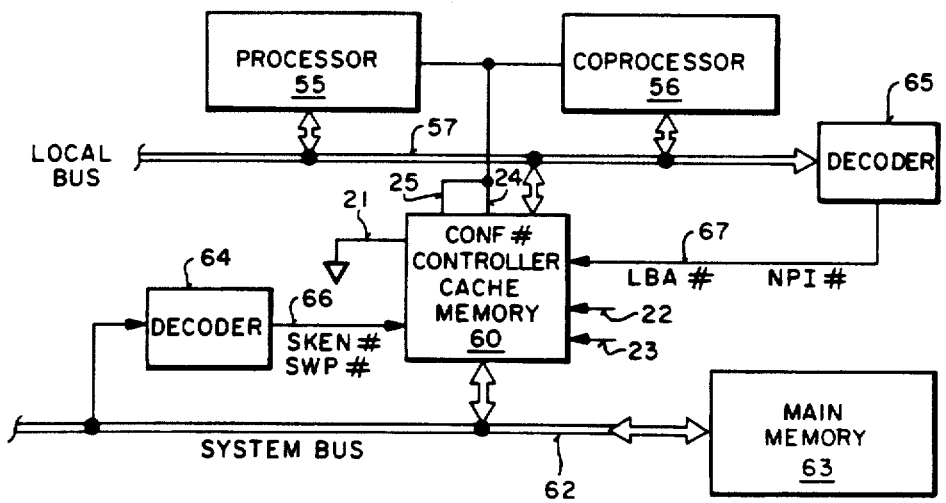

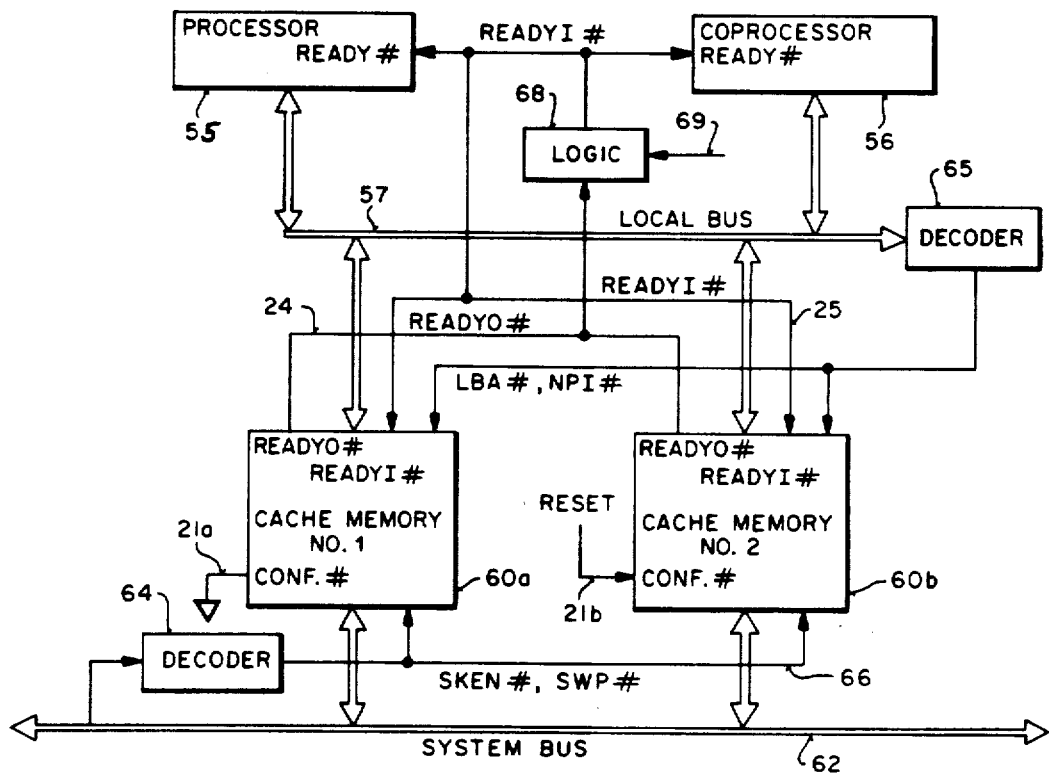
FIG_5A
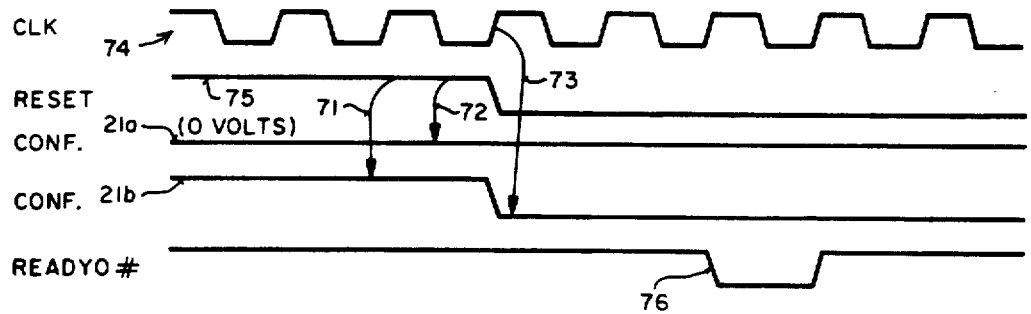
FIG_5B

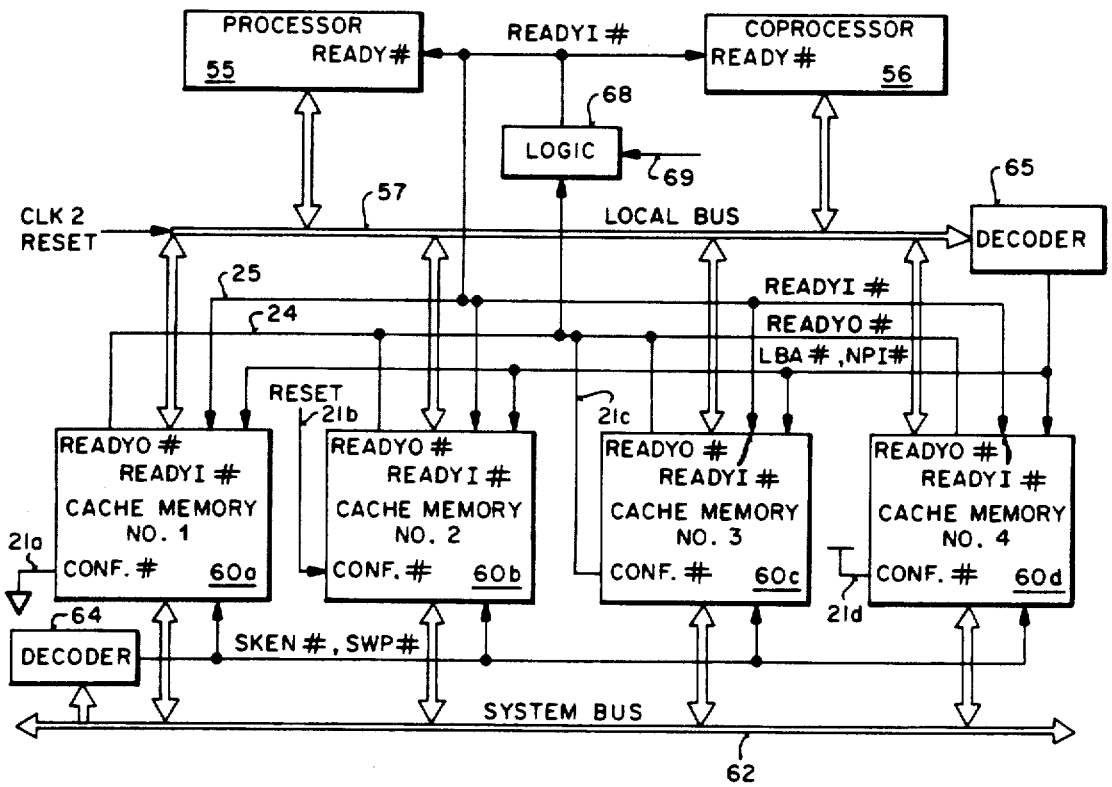
FIG_6A
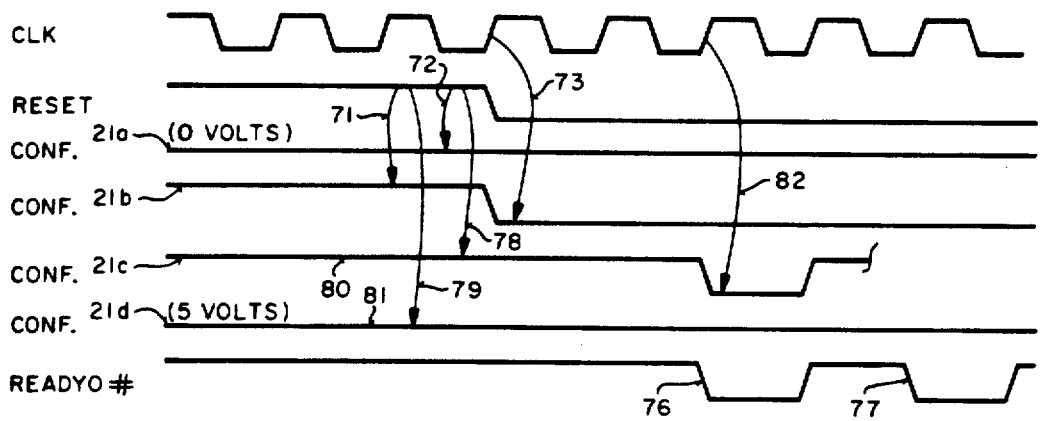
FIG_6B

APPARATUS FOR DETERMINING RELATIVE POSITION OF A CACHE MEMORY IN A CACHE MEMORY ARRAY

BACKGROUND OF THE INVENTION

1. Field of the Invention

The invention relates to the field of cache controllers and cache memories, particularly for microprocessors.

2. Prior Art

The cache controller and cache memory of the present invention is intended for use with the Intel 386 TM microprocessor, although the invention described may be used with other processing units. Intel Corporation manufactures the Part No. 82385, a high performance 32-bit cache controller for use with the Intel 386 TM. This part is used in conjunction with a 32Kbyte cache memory. Many of the signals used in the Intel 82385 and some of the circuitry of this prior art controller are incorporated in the controller of the present invention. A description of the Intel 82385 can be found in "*Microprocessor and Peripheral Handbook, Vol. 1 Microprocessor*", published by Intel Corporation beginning at page 4-287.

With the Intel 82385 as well as other prior art cache controllers, the controller provides an interface between a microprocessor's local bus and a system bus. The controller also communicates with the cache memory. The controller typically includes the local bus interface, system bus interface, cache directory and cache control circuitry. An ordinary static memory is often used for the cache memory.

The present invention is a departure from the Intel 82385 in that the cache controller and cache memory are fabricated on a single chip. Moreover, one, two or four of these chips may be used as part of a cache array. The chips themselves are able to determine how many other members are in this array and each chip determines its relative position in the array.

The prior art discloses numerous computer systems where circuits may be added into the system with the system recognizing the additional circuits and adjusting for them. For example, microprocessor systems are made with "bit-slice" circuits allowing several of the circuits to be coupled together to provide a microprocessor of a desired width (e.g., 4-bit, 8-bit microprocessor, etc.). Memory is frequently added to a computer system with the system adapting to the additional memory. In some cases, a microprocessor writes and reads into different address locations in order to determine how much memory is present on a bus. In other cases, the memory modules contain information concerning its resources.

As will be seen, the present invention provides a unique method and apparatus for configuring a cache array. The information concerning how many cache memories there are in the array and the relative position of each is distributed among the cache memories and, in effect, is transparent to the overall system. Each of the cache memories is identical, thus there is no need to preprogram or otherwise identify a memory before it is placed in the array.

SUMMARY OF THE INVENTION

An improvement in a cache controller/cache memory is described for determining the relative position of the memory in an array which includes others of the memories. The memory is coupled to receive an externally applied configuration signal on a first of its terminals, a reset signal on the second of its terminals, and a clock signal on the third of its terminals; and coupled to receive and provide a ready signal on a fourth terminal. In an array including a plurality of memories, the first configuration terminal is coupled to ground, the second to the reset line, the third to the ready line, and the fourth to the $V_{cc}$ potential.

The cache memory includes control circuit means coupled to these terminals for sensing the configuration signal upon receipt of the reset signal. If the configuration signal is in a first predetermined state, the memory begins counting ready signals under control of the clock signals and knows that it is the primary (NO. 1) memory in an array. If the configuration signal is in a second predetermined state, the memory again senses the configuration signal under control of the clocking signal.

When the memories (other than the first memory) again sense their configuration terminal, the one coupled to the reset line senses that the reset line is inactive and knows that it is the second memory in the array and it issues a ready signal counted by the first memory. If there are four memories in the array, the remaining two memories on the next clock signal again sense their respective configuration terminals. The third memory in the array senses the ready signal and from this determines that it is the third memory in an array of four memories. The fourth memory having again sensed the high potential on its configuration terminal provides a ready signal and from the sequence that occurred knows that it is the fourth memory in an array of four.

BRIEF DESCRIPTION OF THE DRAWINGS

FIG. 1A illustrates the address bits allocation for the tag field, set field and line select bits when one cache memory is used in the present invention.

FIG. 1B illustrates the address bit allocation for the tag field, set field and line select bits when two cache memories are used in the present invention.

FIG. 1C illustrates the address bit allocation for the tag field, set field and line select bits when four cache memories are used in the present invention.

FIG. 1D illustrates the tag field size and set field size with one cache memory in an array.

FIG. 1E illustrates the tag field size and set field size with four cache memories in an array.

FIG. 3 is a block diagram illustrating controller/cache memory of the present invention.

FIG. 4 is a block diagram of a microcomputer system containing two of the invented cache memories.

FIG. 5A is a block diagram of a microcomputer system with two of the invented cache memories.

FIG. 5B illustrates a plurality of waveforms associated with the block diagram of FIG. 5A.

FIG. 6A is a block diagram of a microcomputer system with four of the invented cache memories.

FIG. 6B illustrates a plurality of waveforms associated with the block diagram of FIG. 6A.

DETAILED DESCRIPTION OF THE PRESENT INVENTION

Figure 2:
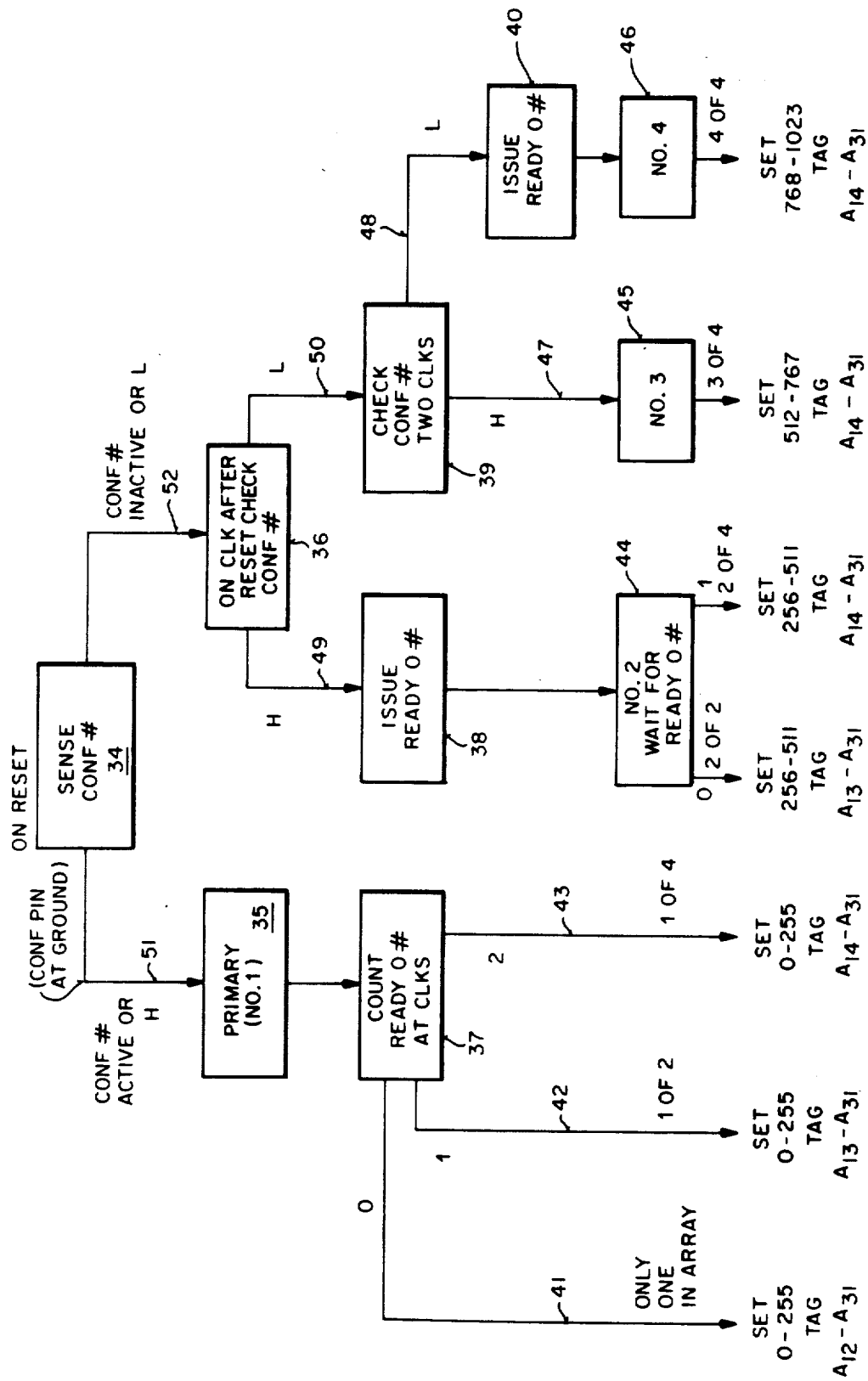
FIG. 2 illustrates the logic implemented by the cache controller of the present invention.

A cache controller/cache memory, fabricated on a single die or chip is described. In the following description, numerous specific details are set forth such as specific binary states, number of bits, etc. in order to provide a thorough understanding of the present invention. It will be obvious to one skilled in the art that the present invention may be practiced without these specific details. In other instances, well known circuits are not described in detail in order not to unnecessarily obscure the present invention.

Overview of the Present Invention

A cache controller and cache memory fabricated on a single substrate is described. (In the following description, the combination of the controller and cache or cache memory is sometimes referred to simply as the controller/cache memory or the cache memory). In the currently preferred embodiment the controller/cache memory is fabricated employing metal-oxide-semiconductor (MOS) technology, more specifically complementary MOS technology. Any one of a plurality of well-known processes may be used to fabricate the cache memory. In the currently preferred embodiment, each of the controller/cache memories includes a controller and 16Kbytes of cache memory. Many aspects of the currently preferred embodiment are not described since they are well-known in the prior art and are used in the prior art cache controllers, particularly the Intel 82385 and the cache memory of the Intel 486 TM.

In general, the controller/cache memory of the present invention is coupled between the local bus of a microprocessor and a system bus. One, two or four embodiment, the number of cache memories in the cache memory array is essentially transparent in the system.

The information concerning how many cache memories there are and the address range associated with each is distributed among the cache memories themselves. Self-configuration automatically occurs upon activation of the system and, more particularly, at the time the reset signal appears.

The information concerning the number of cache memories in the system and the relative position of each of them (e.g., whether a particular cache memory is 1 of 1, 1 of 4, 2 of 4, etc.) is determined by each of the cache memories in an array. Each cache memory includes a configuration terminal which is wired differently (external to the cache memory) depending upon the cache memory's position in the array, as will be seen.

For instance, when the computer system is fabricated, four sockets can be included within the system for a cache array, each for receiving one of the invented cache memories. A user may then place one, two or four cache memories in the system as desired. Each socket is identically wired except for one lead or pin, the "configuration terminal". The first cache memory in the array has its configuration terminal coupled to ground, the second to the reset line, the third to the Ready0# line and the fourth to the $V_{cc}$ potential. As will be seen, when the system is reset, each of the memories is able to determine its position in the array and the total number of cache memories in the array.

The size of the tag fields and the range of the set fields of the cache directory change depending on the number of cache memories in the array. In the currently preferred embodiment, two bits ($A_{12}$ and $A_{13}$), in effect, shift from being part of the tag field to being part of the set field. These bits are used to enable different ones of the cache memory in the array.

Currently Preferred Embodiment of the Cache Controller/Cache Memory

As mentioned, each chip or substrate includes both the cache controller and a 16Kbyte cache memory. The features of the Intel 82385 for the most part are incorporated in the present invention. Additionally, each controller/cache memory can map four gigabytes of main memory into its 16K cache memory such that in a maximum configuration (four controller/cache memories in an array) four gigabytes of main memory are mapped into a 64K cache. The cache memory is unified for code and data. The controller provides a cache consistency mechanism which gurarantees that the cache memory has the most recently updated version of the main memory. Consistency support does not impact the performance of the microprocessor coupled to the controller/cache memory. The internal structure of the controller/cache memory in many ways is similar to the controller/cache memory commercially available as part of the Intel 486 TM except that the controller/cache memory size is double that of the Intel 486 TM. For example, the controller/cache memory of the present invention is four-way set associative and employs a pseudo LRU replacement algorithm. The line size is 16 bytes and a full line is fetched from memory for every miss condition. The controller/cache memory's write mechanism employs a write through algorithm enhanced by a four deep write buffer. Cache consistency is provided by the SAHOLD/SEADS# snooping mechanism, similar to that employed in the Intel 486 TM. In actual performance, the controller/cache memory of the present invention is able to run a zero wait state, 33 mHz, non-pipelined read cycle with the Intel 386 TM microprocessor if the data exists in the cache memory. Obviously, if the data does not exist in the cache memory, the performance will depend on the system bus latency. Memory write cycles can run with zero wait states if the write buffer is not filled.

Referring now to FIG. 3, the portions of the controller/cache memory needed to understand the present invention are illustrated. The cache or cache memory 10- that is, where the data is stored, is shown as memory 10. Four banks of memory are used for the 4-way associative cache. As is typically the case, the data storage comprises a static random access memory, more specifically, where each bit of data is stored in a six transistor bistable cell.

Data is addressed in the cache memory 10 by the set selector 12. The set selector 12, includes a plurality of set fields (8 bits wide). For each combination of the address bits $A_4$ through $A_{11}$, the set selector selects data in the four banks of the cache memory 10 and four tag fields in the tag storage 13.

As is commonly done in cache controllers, the tag field or fields is compared with the incoming address to determine if the data is present in the cache memory 10. Comparator 15 compares the incoming address bits $A_{12}$ through $A_{31}$ with the four tag fields. The result of this comparison either selects one of the four banks of cache memory as indicated by line 19 coupled to the line selector 11, or a miss is issued as indicated by line 18. The address bits $A_2$ and $A_3$ are for double-word selection through selector 14. Data is coupled to (and from) the cache memory on the bus 17.

As will be described in greater detail, the address bits $A_{12}$ and $A_{13}$ in effect shift from tag bits to set bits as cache memories are added to the array. More specifically, the bits $A_{12}$ and $A_{13}$ are used to enable specific ones of the controller/cache memories as indicated by the enable memory circuit 16.

The control and configuration circuit 20 determines how many controller/cache memories are in the array and the particular memories relative position in the array (e.g., 1 of 1, 2 of 4, etc.). The control and configuration circuit 20 receives: a CONF# signal on line/terminal 21, a reset signal on line/terminal 22, a clocking or timing signal on line/terminal 23, and receives and provides a Ready0# signal on line/terminal 24. From these signals, the control and configuration circuit 20 determines whether the particular memory is 1 of 1, 1 of 2, 2 of 2, 1 of 4, 2 of 4, 3 of 4, or 4 of 4 in an array. This information is coupled to the enable memory circuit 16 and as will be discussed, determines how the bits $A_{12}$ and $A_{13}$ are used. If, by way of example, there are two controller/cache memories in an array, bit $A_{12}$ is used to determine which of the two memories is selected while bit $A_{13}$ remains part of the tag field and participates in the comparison process. The signals $XA_{12}$ and $XA_{13}$ on lines 29 and 30 respectively, issue from the circuit 20 and determine whether the comparator considers bits $A_{12}$ and/or $A_{13}$ in the comparison process. Again, by way of example, if there are four controller/cache memories in an array both bits $A_{12}$ and $A_{13}$ are ignored as part of the comparison process.

Also as will be discussed later, when there are more than one controller/cache memory in an array, the first of the memories provides the control signals for the system bus. Thus, if a signal is provided on line 28 indicating that a particular controller/cache memory is "1 of 1", the system bus control signal driver 28 is activated, allowing signals to be driven on to the system bus from the "1 of 1" controller/cache memory for all the memories in the array.

The logic implemented by the control and configuration circuit 20 insofar as it involves the present invention is shown in FIG. 2.

On reset, as will now be described, each of the controller/cache memories determine its relative position in an array and how many memories are in the array (1 of 4, 2 of 4, etc.). As indicated by block 34, when the reset signal is high, circuit 20 senses the potential on terminal 21. If this potential is a first predetermined signal, (in the preferred embodiment, ground potential, that is, CONF# is active) the memory is the primary or first (NO. 1.) memory in an array. (The number of other memories in the array is not known at this time by memory NO. 1.) The sensing of the first predetermined signal is indicated by line 51 in FIG. 2 and the recognition by the memory of its status as NO. 1 in the array by block 35. As indicated by block 37, this first controller/cache memory counts the number of Ready0# signals that occur during the next four clocking signals to determine how many other controller/cache memories are in the array. Specifically, if no Ready0# signals are counted as indicated by line 41, it is the only memory in the array, if one Ready0# signal is sensed there are two memories in the array, and, if two signals are counted there are four memories in the array as indicated by line 43.

If, on the other hand, on reset when terminal 21 is sensed, a second predetermined signal is found (specifically, 5 volts) the controller/cache memory knows that it is not NO. 1 and proceeds as indicated by line 52 to step 36.

On the next clock signal after reset, the potential on the configuration terminal is again sensed by the memories except by the NO. 1 memory. As indicated by the block 36, if the CONF# terminal is high (line 49) the circuit provides a Ready0# signal on terminal 24 (block 38) and as indicated by block 44 this memory now counts Ready0# signals (if no longer reacts to the potential on the configuration terminal). The memory knows it is NO. 2 in the array. If no Ready0# signals are received the memory is "2 of 2", and if one Ready0# signal is counted, the memory is "2 of 4".

In contrast, at step 36, if the CONF# signal is low (indicated by line 50) the configuration terminal is again sampled after two clock cycles as indicated by block 39. If at this sampling, CONF# is high (line 47) the memory is "3 of 4" (block 45). If at step 39 the CONF# signal is low (line 48), the memory provides a signal on a Ready0# signal (block 40) and then knows that it is "4 of 4" (block 46).

The logic illustrated by FIG. 2 is readily implemented using well known circuits and, as mentioned, is part of the control and configuration circuit 20 of FIG. 3.

Referring to FIGS. 1A and 1D, if there is only one controller/cache memory in an array, the tag fields consist of address bits $A_{12}$ through $A_{31}$ and the set fields consists of bits $A_4$ through $A_{11}$. The address $A_4$ through $A_{11}$ then selects a set (1 of 256 sets).

Referring to FIG. 1B, if there are two controller/cache memories in an array, the tag field becomes narrower and consists of address bits $A_{13}$ through $A_{31}$ and, in effect, $A_{12}$ is moved to and becomes part of the set field. Specifically, $A_{12}$ is used to select one of the two cache memories through the enable memory circuit of FIG. 3. This is equivalent to $A_{12}$ being the highest order set bit. Thus, if $A_{12}$ is low, the first memory is selected and the set field is 0-255 as indicated by line 42 of FIG. 2. On the other hand, if $A_{12}$ is high, the second of the memories is selected and the set field ranges from 256 to 511 as indicated by the "2 of 2" line emerging from block 44 of FIG. 2.

Referring now to FIGS. 1C and 1E, assume there are four controller/cache memories in an array. For this case, the tag fields consists of bits $A_{14}$ through $A_{31}$ with the address bits $A_{12}$ and $A_{13}$ being effectively part of the fields. These two bits, as indicated by FIG. 3 are used to select one of the four memories in the array. By way of example, if a particular memory knows that it is "4 of 4" it communicates this information to the enable memory circuit 16 from the circuit 20 and the enable memory circuit 16 enables the memory when $A_{12}$ and $A_{13}$ are both high. Similarly, the "1 of 4" memory in the array is enabled when both address bits $A_{12}$ and $A_{13}$ are low, this causes the set field to have the range of 0-255 as indicated by line 43 of FIG. 2. For the second memory in an array of 4 memories, the set field has a range of 256-511 since this memory is enabled when $A_{13}$ is low and $A_{12}$ is high. Similarly, the third memory is enabled when $A_{13}$ is high and $A_{12}$ is low, providing a set field with a range of 512-767; and finally, the fourth memory is enabled when both $A_{12}$ and $A_{13}$ are high providing a set field range of 768-1023. In FIG. 1E the "X's" at the right end of the tag fields are used to indicate that for the four memory case, the bits $A_{12}$ and $A_{13}$ are ignored as part of the comparison and have been shifted to and operate as part of the set field.

Use of Invented Controller/Cache Memory in Microprocessor Systems

A. Configuration

Referring first to FIG. 4, a typical microcomputer system employing one of the invented controller/cache memory 60 is illustrated. The memory 60 is coupled to a local bus 57 and to a system bus 62. A processor 55 (such as the Intel 386 TM) is coupled to the local bus 57; a coprocessor 56 (such as the Intel 387 TM) is also coupled to this bus. The system bus 62 is coupled to a main memory 63 such as a DRAM memory. Other peripherals are typically connected to the system bus 62. For the arrangement of FIG. 4, the configuration terminal 21 is coupled to ground as it is for the first (NO. 1) memory in the array (no matter how many others, if any, are in the array). For the arrangement of FIG. 4, the ReadyO# terminal 24 and the Ready1# terminal 25 are shown connected together, and connected to the processor and coprocessor. (In subsequent examples, these ready lines are shown not directly connected as will be discussed.) Decoder 65 asserts on line 67 LBA# and/or NPI# whenever an access is made to an address which is used by a local bus device or to an address which requires non-posted accesses. The decoder's programming depends on the specific implementation of the system in which the memory 60 is used. The SKEN# and SWP# signals on lines 66 are provided by decoder 64 for accesses to non-cacheable addresses or to write-protected addresses.

Importantly, it should be noted that the first memory 60 used in an array has its configuration terminal 21 coupled to ground. Hence, upon reset CONF# will be high as indicated by line 51 of FIG. 2, informing the memory 60 that it is the first in the array. As previously mentioned, a signal on line 28 of FIG. 3 causes driver 28 memory NO. 1 to provide control signals for the bus 62. During the next few clock cycles for the arrangement of FIG. 4, no ready signals will be sensed on line 24 and thus, the conditions represented by line 41 of FIG. 2 are met; that is, memory 60 is the only cache memory in the array.

In FIG. 5A, a computer system is illustrated with includes two controller/cache memories identified as memories 60a (NO. 1) and 60b (NO. 2). The only difference between these memories' coupling to the system is in their configuration terminal connections. Note the configuration terminal 21a of memory 60a is again coupled to ground, while the configuration terminal 21b of memory 60b is coupled to the reset line. Otherwise, both memories are coupled in the same manner to the buses and lines in the system. For example, both memories receive the reset signal on their reset terminal as well as the clocking signal (not illustrated). The ReadyO# terminals of both memories are coupled to logic circuit 68. This circuit is an ordinary OR gate which receives other inputs such as on line 69 to allow a logical ORing of other ready signals to the processor and coprocessor (from devices other than the array). The Ready1# signal, the output of the logic circuit 68, is coupled to the line/terminals 25.

As will be seen, the fact that the configuration terminal of the second memory is coupled to the reset line allows the second memory to determine its place in the array. In FIG. 5B, the clocking signal 74 is shown which, as mentioned, is applied to both memories. Also, the reset signal 75 is shown which is coupled to the reset terminal of both memories and the configuration terminal of memory 60b. During reset when the reset signal is high, the control circuits of both memories 60a and 60b sense the signal on their respective configuration terminals as represented by block 34 of FIG. 2. Memory 60a senses the potential on line 21a which is ground potential. This is indicated by the arrow 72. The complement of this signal (CONF#) is high as indicated by line 51 in FIG. 2 alerting memory 60a to its status as the primary (NO. 1) memory in the array. Memory 60b, on the other hand, at this time (reset still active) senses a high potential on its configuration terminal as shown by arrow 71. Accordingly, memory 60b determines that it is not NO. 1 in the array. After the reset signal become inactive, and under control of the clocking signals as indicated by line 73, memory 60b again senses the potential on its configuration terminal. This time it finds the potential low since the reset signal has dropped in potential. The complement of this low signal is shown by line 49 in FIG. 2. Memory 60b then provides a signal on line 24, this is shown as waveform 76 in FIG. 5B and is represented by block 38 of FIG. 2. (In the current implementation, two clock cycles occur before waveform 76 is provided). The waveform 76 is sensed by memory 60a on line 24. Memory 60a having counted one count (there will only be one ready signal in the first few clocking cycles since there are no other memories in the array) determines that there are two memories in the array as indicated by line 42 of FIG. 2. Similarly, since there are no additional ready signals, the NO. 2 memory determines that it is "2 of 2" in the array.

Referring now to FIG. 6A, a computer system is again shown, however this time with four controller/cache memories 60a, 60b 60c and 60d in an array. Each of the memories is coupled to both the local bus and the system bus as in the previous examples. The memories receive the Ready1# signal, the reset signal on their reset terminal and clock signal on their clocking terminal (the latter two terminals are not illustrated in this figure). The only difference between the memories insofar as their coupling in the system of FIG. 6A is concerned, is that the configuration terminal of 21a of memory 60a is coupled to ground, the configuration terminal 21b of memory 60b is coupled to the reset line, the configuration 21c of memory 60c is coupled to the ReadyO# line and finally, the configuration terminal 21d of memory 60d is coupled to the $V_{cc}$ potential (5 Volts).

The waveforms in 6B, in conjunction with the logic diagram of FIG. 2, illustrates the initialization occuring on reset for the system of FIG. 6A.

When the reset signal is high, as previously indicated by arrows 71 and 72, memories 60a and 60b sense their configuration terminal. During this time, memory 60d senses the waveform 80 as indicated by arrow 78, a high potential (ReadyO# is high at this time). Thus, memory 60c proceeds to step or block 36 of FIG. 2. Likewise memory 60d, as indicated by arrow 79 and waveform 81 senses a positive potential, the complement of which is low; memory 60d hence is logically at block 36. At the time indicated by the arrow 73, both memories 60c and 60d again sense their configuration terminal. There is no change in the potential for waveforms 80 and 81 at the time represented by arrow 73 and accordingly, the logic associated with these memories proceeds to block 39 of FIG. 2. After two clock cycles as indicated by arrow 82, waveform 80 drops in potential because memory 60b has issued a ReadyO# signal (waveform 76). Thus, memory 60c determines that it is "3 of 4" as indicated by line 47 of FIG. 2. Then memory 60d issues a Ready0# signal (waveform 77) thereby informing memories 60a and 60b that there are four memories in the array. Since the configuration terminal of memory 60d is always high (CONF# low) this memory knows that it is "4 of 4" in the array.

B. Bus Driving

On the local bus 57, the Ready0# signal is the only driven by all of the cache memories. Nominally, the Ready0# line 24 is not driven, rather a pull-up device external to the memories is used to maintain this line at $V_{cc}$. Typically, a resistor couples this line to $V_{cc}$. During cacheable read cycles, the selected memory drives Ready0# active until Ready1# (line 25) is sense active, then the selected memory drives Ready0# inactive for one clock phase; line 25 is then released by the memory and allowed to be pulled up by the external pull-up device. In other cycles, the primary (NO. 1 memory) drives Ready0# in the same manner. On the data bus, the selected memory drives the data bus during the "T2" portion of the read cycle, thereby ensuring no contention with the processor when a read cycle follows the write cycle.

On the system bus 62 as mentioned, the primary memory drives all the system bus signals except the SADS#. Thus, the possibility of contention exists only for the SADS# signal. The SADS# line is nominally not driven by any of the memories, but rather left floating with the line carrying this signal coupled to a pull-up device. All the memories in the array, including the primary, after driving the SADS# line active, drive it inactive for one clock phase then allow it to float. During line fills, the SADS# line signal is driven by the memory which detects the miss. In all other cycles, including write cycles, the SADS# line is driven by the primary memory.

Thus, by the simple connection to the configuration terminal to the various signals available in the computer system, each of the four controller/cache memories determines how many memories are in the array of memories and its relative position in the array. Moreover, each of the memories adjusts its tag field and set fields in a manner totally transparent to the computer system to provide additional cache memory.

We claim:

1. In a cache memory, an improvement for determining the relative position of said cache memory in an array which includes other cache memories comprising:
    a first terminal for receiving an externally applied configuration signal;
    a second terminal for receiving a reset signal;
    a third terminal for receiving a timing signal;
    a fourth terminal for providing and receiving a ready signal;
    circuit means coupled to said first, second, third and fourth terminals for sensing said configuration signal upon receiving said reset signal, and for;
    while said configuration signal is a first predetermined signal, counting ready signals under control of said timing signal;
    while said configuration signal is a second predetermined signal again sensing said configuration signal under control of said timing signal.

2. The improvement defined by claim 1 wherein said cache memory is coupled to a system bus and a local bus and if said configuration signal is said first predetermined signal, said cache memory enabling a system bus driving means for driving bus signals on to said system bus.

3. The improvement defined by claim 1 or claim 2 wherein if said configuration signal is said second predetermined signal, said circuit means performing a second sensing of said configuration signal under control of said timing signal, and, if after again being sensed, said configuration signal is said first predetermined signal, providing a ready signal on said fourth terminal and then counting ready signals received on said fourth terminal;
    if said configuration signal is said second predetermined signal then performing a third sensing of said configuration signal under control of said timing signal.

4. The improvement defined by claim 3 wherein if said third sensing of said configuration signal senses said second predetermined signal, providing a ready signal on said fourth terminal.

5. The improvement defined by claim 4 wherein said first predetermined signal is a ground signal.

6. The improvement defined by claim 5 wherein said second predetermined signal is a positive potential.

7. In a cache memory for coupling to a local bus and a system bus, an improvement comprising:
    control means coupled to receive a reset signal, a timing signal, and configuration signal, and coupled to receive and provide a ready signal, said control means on receiving of said reset signal providing at least one control means signal indicating if said cache memory is the primary memory in an array of other cache memories; and,
    bus driving means coupled to said control means for providing bus signals for said local bus and said system bus, said bus driving means enabling a predetermined bus signal if said control means signal indicates said cache memory is said primary memory and said bus driving means for disabling said predetermined bus signal if said control means signal indicates that said cache memory is other than said primary memory.

8. The improvement defined by claim 7 wherein said bus driving means provides a signal to said system bus indicating a miss in said memory independent of said control means signal.

9. The improvement defined by claim 7 wherein said bus driving means provides said ready signal independent of said control means signal.

* * * * *

UNITED STATES PATENT AND TRADEMARK OFFICE
CERTIFICATE OF CORRECTION

PATENT NO. : 5,175,833
DATED : December 29, 1992
INVENTOR(S) : Eran Yarkoni and Zvi Netzer It is certified that error appears in the above-indentified patent and that said Letters Patent is hereby corrected as shown below:

Col. 3, Line 29    After the word "four"    Insert --controller/cache identical memories may be used. In the currently preferred--

Col. 8, Line 33    After "60b"    Insert --,--

Col. 9, Line 10,    After "only"    Insert --signal--

Signed and Sealed this

Twenty-seventh Day of September, 1994

Attest:

BRUCE LEHMAN

*Attesting Officer*    *Commissioner of Patents and Trademarks*